Dec. 18, 1962 R. P. HOLLAENDER 3,069,189
PIPE CONNECTOR
Filed March 7, 1960 2 Sheets-Sheet 1
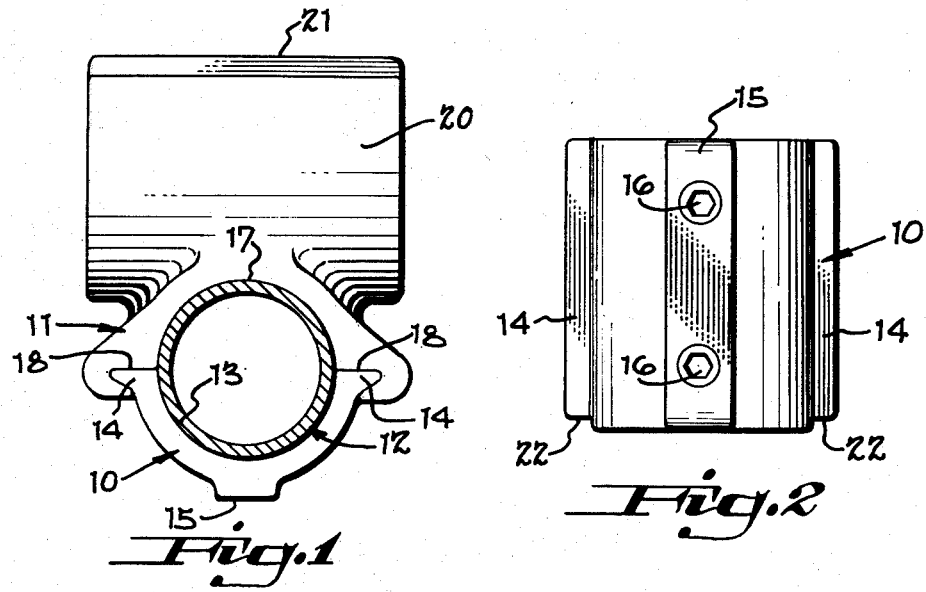
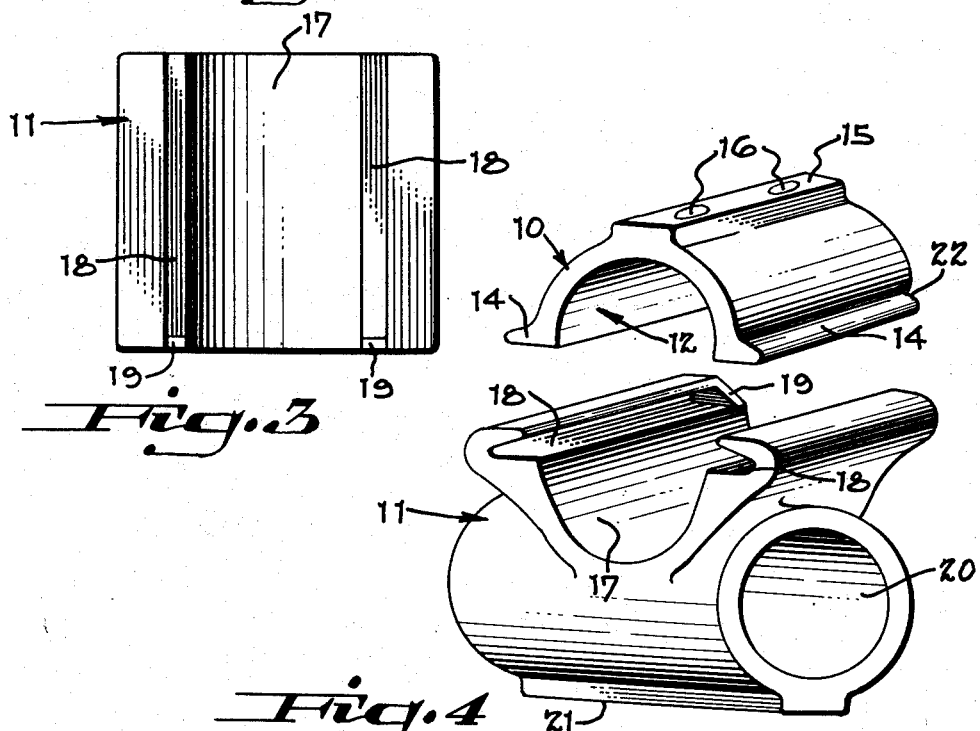
INVENTOR.
Robert P. Hollaender
BY
Wood, Herron & Evans.
ATTORNEYS.

Dec. 18, 1962 — R. P. HOLLAENDER — 3,069,189
PIPE CONNECTOR

Filed March 7, 1960 — 2 Sheets-Sheet 2

INVENTOR.
Robert P. Hollaender
BY Wood, Herron & Evans
ATTORNEYS.

3,069,189
PIPE CONNECTOR
Robert P. Hollaender, Cincinnati, Ohio, assignor to The Hollaender Manufacturing Co., Cincinnati, Ohio, a corporation of Ohio
Filed Mar. 7, 1960, Ser. No. 13,256
6 Claims. (Cl. 287—54)

This invention relates to pipe connectors of the type adapted to join a pair of pipes or rods which cross or extend angularly with respect to one another. More particularly, it relates to connectors of the split sleeve type wherein at least one of the pipes is gripped by a sleeve formed from two interengageable half sleeves.

Split sleeve connectors comprise two semicylindrical elements, or half sleeves, each half sleeve being provided along its longitudinal edges with means whereby it can be slid into engagement with a cooperating half sleeve around one of the pipes or rods which it is to join. One or both of the half sleeves are provided with connections for other pipes or other members to be joined, which connections may be a socket, sleeve, tongue, or the like.

Connectors of this type are used in constructing conventional pipe structures, as for example, railings. In addition, however, the connectors of this invention are specifically adapted for use in erecting scaffolding, where, for example, cross braces may be connected at right angles, or at 45° angles, between vertical members to rigidly the scaffolding. In the erection of such structures it is frequently necessary that one length of pipe be connected to another, with respect to which it extends angularly, at a point which is between the ends of one or both pipes. The connector of this invention is especially adapted for such installation in that it may readily be clamped onto either member without being slid longitudinally along the full length of the pipe. Thus, the invention is particularly suitable for use in situations in which it is impossible or undesirable to position the connector by sliding it longitudinally along the pipe from one end thereof, as where the pipes have been previously connected to other pipes at their ends.

I have invented an improved connector of the split sleeve type which demonstrates excellent strength in relation to its weight and size and which, furthermore, is capable of supporting heavy loads even when installed on a vertical rod or pipe without slipping or opening under load.

The connector of this invention comprises two semi-cylindrical, interengageable half sleeves each having an inner surface which substantially conforms to a half circumference of the pipe onto which it is to be installed. One half sleeve is provided with outwardly extending flanges on its longitudinal margins while the other half sleeve is provided with grooves or channels along its longitudinal margins into which the flanges of the first member are slidably received in assembly of the two. Set screws or other gripping or clamping means are provided in one or both half sleeves to hold the pipe between the two. Socket or other means for holding a second pipe or other member are provided on one or both half sleeves.

Sleeves generally of the foregoing description have been previously used. I have discovered, however, that if the channels of the one half sleeve are so formed that at one point therealong an integral solid web portion extends across the channel, interconnecting the opposed surfaces defining the channel, the resulting connector will display excellent strength in relation to similar connectors which are not provided with such a web, and furthermore that, if properly arranged on a pipe, the connector is capable of supporting much greater longitudinal and transverse thrusts than otherwise possible.

The channel webs contemplated by this invention have two purposes. Extending across the channels, preferably at the ends thereof, they limit the slidability of the other half sleeve relative thereto, so that that element can be disconnected, acidentally or purposefully, from the other only if it is slid in a single given direction. Thus, if the channeled half sleeve is arranged on a vertical member so that the webs limit the downward slidability of that half sleeve with respect to flanged half sleeve, and set screws in the flanged half sleeve are tightened to clamp the pipe between the two, the connector will support loads several times those which it would otherwise be capable of supporting.

The second function of these webs is to strengthen the overall channel structure by directly joining or integrating the opposite sides of the channel. For example, under a severe load directed perpendicularly to the pipe about which the half-sleeves are assembled, the channels of the one half sleeve might, in the absence of the web, deform and tend to open, whereby the grip of the two halves on the pipe is loosened. With the provision of the channel webs, however, the webs are simply put in tension so that the channels cannot deform, at least to any dangerous extent, with the result that the structure can bear great transverse loads, as well as great longitudinal loading.

The invention can best be further described by reference to the accompanying drawings, in which:

FIGURE 1 is an end view of a preferred embodiment of a split sleeve connector in accordance with this invention, in assembled relationship on a pipe;

FIGURE 2 is a top view of the flanged half sleeve, showing a preferred arrangement of set screws therein;

FIGURE 3 is a bottom view of the channeled half sleeve, showing the webs disposed at the ends of the channels;

FIGURE 4 is a perspective view of the preferred embodiment of the connector, shown in disassembled relationship;

Figure 5:
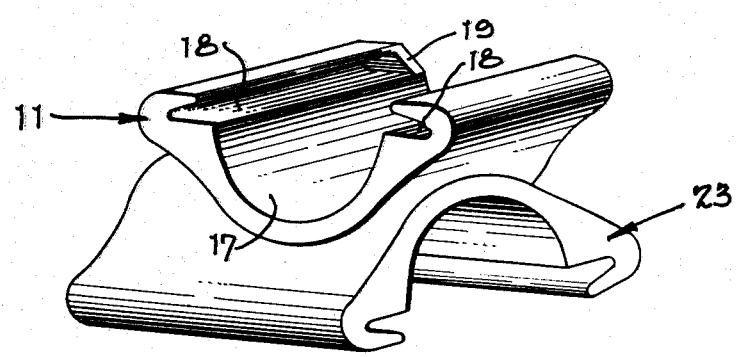
FIGURE 5 is a perspective view of a modified embodiment of the invention in which split sleeves in accordance with the invention are provided for connection to both pipes.

While the connector of this invention is particularly adapted for joining two or more pipes which extend or cross angularly with respect to one another, it will be appreciated that the novel split sleeve it provides comprises the means for gripping only one of the pipes; the means for connection to the second pipe or other member comprise a socket formed on one of the half sleeves, for example, or may be a sleeve, or may also comprise a half sleeve embodying the principles of the invention. It is also contemplated that the connector may be employed to join a single pipe to a member other than a second pipe as for instance, to a fixed plate. Thus, in its most general aspect the invention is directed only to a split sleeve for gripping a single pipe, the additional means for connection to another pipe or other member not, in general, being a part of the invention.

In FIGURES 1 through 4 is shown an embodiment of the invention wherein the means for joining the second member is a unitary cylindrical sleeve formed as part of one half sleeve.

As is best shown in FIGURE 4, this embodiment of the invention comprises two interengageable half sleeve elements or components denoted by 10 and 11. Element 10 is conveniently referred to as the flanged half sleeve, while component 11 is referred to as the channeled half sleeve, for reasons which will be apparent from inspection of the drawings.

The flanged half sleeve 10 is generally semicylindrical in shape, having a clamping surface 12 which generally conforms to the surface of the pipe 13 onto which it is to be installed. Along the longitudinal margins of half sleeve 10 substantially diametrically opposed to one another are outwardly extending flanges 14, 14 which extend nearly the full length of the element. A boss 15 on the outside surface of the element is provided with a pair of set screws 16, 16 which can be threaded toward or away from the clamping surface 12 to grip or clamp the pipe, as shown in FIGURE 1.

The channeled half sleeve 11 is generally a half cylindrical element having a clamping surface 17 substantially conforming to the surface of pipe 13, and is provided with channels 18, 18 adjacent the clamping surface on each longitudinal marginal edge. In each channel 18, preferably adjacent the end thereof, a web portion 19 extends between the opposite sides defining the channel, and is formed integrally therewith. This web is best shown in FIGURES 3 and 4. Means for joining a second pipe, not shown, comprising a hollow cylindrical sleeve 20 are formed integrally with the channeled half sleeve 11. On sleeve means 20 is provided a boss 21 into which set screws, not shown, are tapped whereby the second pipe may be gripped.

The half sleeves 10 and 11 are shown in assembled relationship in FIGURE 1. As can be seen, the outwardly directed flanges 14, 14 on element 10 are slidably received in the channels 18, 18 of element 11. It is preferable that the elements be the same length, and that the flanges terminate a short distance from the end of element 10, as at 22 in FIGURE 2, so that when the ends of the flanges contact the webs 19, the half sleeves are longitudinally aligned.

The connector is assembled on a pipe simply by placing one half sleeve on the pipe at the desired location and sliding the other oppositely located half sleeve toward the first to engage the flanges in the channels, and then tightening the set screws so that the pipe is gripped between the two. The other pipe to be joined is then inserted in the sleeve 20 and set screws in that sleeve tightened.

Where the connector is installed on a vertical pipe, the provision of webs 19, 19 enables the coupling to bear great downward thrust without the two half sleeves sliding out of engagement, provided half element 11 is placed on the vertical pipe so that the webs prevent relative downward motion of element 11 with respect to element 10. The set screws in element 10, tightened into the pipe, prevent that element (10) from sliding downwardly on the pipe, while the webs bearing on the ends 22 of the flanges prevent the other split element (11), and the second pipe or other member connected to it, from sliding downwardly. In general, the connector can be arranged to resist disengagement by forces directly parallel to the longitudinal axis of any pipe to which it is attached simply by so locating element 11 on the pipe that the webs are in the direction from which the force is applied.

Provision of the webs across the channels also enables the connector to bear heavy loading in directions perpendicular to the axis of the pipe clamped which might otherwise tend to deform the channels or gradually bend them open, releasing the flanges. In accordance with this invention, however, the webs are put in tension by such forces and themselves take up the load, thereby relieving the channels to a great extent.

In the foregoing embodiment, connection to a second pipe is effected through a sleeve 20 formed as part of element 11. In FIGURE 5, connection to a second pipe is by way of a half sleeve which itself embodies the principles of the invention. In that figure, a second channeled half sleeve 23 is formed integrally with channel element 11. Flanged half sleeves 10 as shown in FIGURE 2 are received in the channels of each of the half sleeves 23 and 11 of FIGURE 5 to form the connection.

Figure 6:
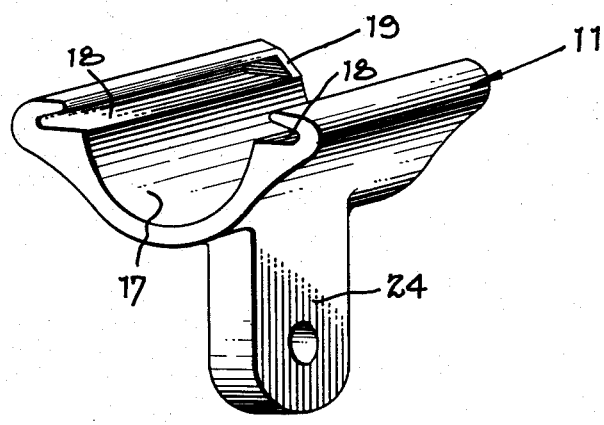
FIGURE 6 is a perspective view of another embodiment of the invention in which the channeled half sleeve is provided with a tongue for connection to another member.

In FIGURE 6, instead of a connection to a second pipe, channel element 11 is provided with a tongue 24 for connection to a clevis or other member. It will be appreciated that a variety of arrangements for receiving a second pipe or for other connection can be provided on either of the half sleeves of the connector.

The elements 10 and 11 may conveniently be cast in aluminum or other metal.

Arrangements other than the two set screws shown can be used for gripping the pipe between the two half sleeves.

Having described my invention, I claim:

1. A connector of the split sleeve type adapted to grip a rod-like member and to connect said rod-like member to another member, said connector comprising a first element and a second element, said first element presenting an inner surface which substantially conforms to the surface of said rod-like member for facial engagement therewith, substantially diametrically extending flanges on the longitudinal edges of said first element, said second element presenting an inner surface which substantially conforms to the surface of said rod-like member for facial engagement therewith, said second element having slot means on its longitudinal edges for slidably receiving the flanges of said first element, a web extending across each said slot means between the sides thereof, said webs limiting the slide of said flanges when engaged in said slot means whereby said elements when engaged can be disengaged only by forces acting in one longitudinal direction with respect to said elements but not in the opposite direction, each web uniting the opposite surfaces defining each said slot means whereby said webs are put in tension by forces directed transversely to said slot means and tending to pull said elements apart, set screw means in one of said elements disposed substantially perpendicularly to the inner surface thereof for gripping said rod-like member between the first and second elements of said connector whereby said flanges and slot means are forced into tighter engagement with each other as said set screw means are tightened against a rod-like member therebetween, and means presented by one of said elements for connection to said other member.

2. A connector in accordance with claim 1 wherein said webs are at the ends of said slot means.

3. A connector in accordance with claim 1 wherein said flanges are directed diametrically outwardly from the inner surface of said first element and wherein said slot means open onto the inner surface of said second element.

4. A connector in accordance with claim 1 in which said set screw means is disposed in said first element.

5. A connector in accordance with claim 1 wherein said other member is a pipe and wherein said means for connection to said other member comprises a sleeve formed integrally with one of said elements, said sleeve having screw means for gripping said pipe.

6. A connector in accordance with claim 5 wherein said sleeve is formed integrally with said second element.

References Cited in the file of this patent

UNITED STATES PATENTS

| 287,651 | Faust | Oct. 30, 1883 |
|---|---|---|
| 1,173,061 | Tregloune | July 4, 1933 |
| 1,916,930 | Lyness | July 4, 1933 |

FOREIGN PATENTS

| 429,565 | Great Britain | May 31, 1935 |
|---|---|---|
| 602,208 | Great Britain | May 21, 1948 |
| 332,249 | Switzerland | Oct. 15, 1958 |
| 535,853 | Italy | Nov. 18, 1955 |